Aug. 27, 1940.  E. BAGULEY  2,212,927
LEAD COVERED MULTICONDUCTOR ELECTRIC TELEPHONE CABLE
Filed Feb. 13, 1940
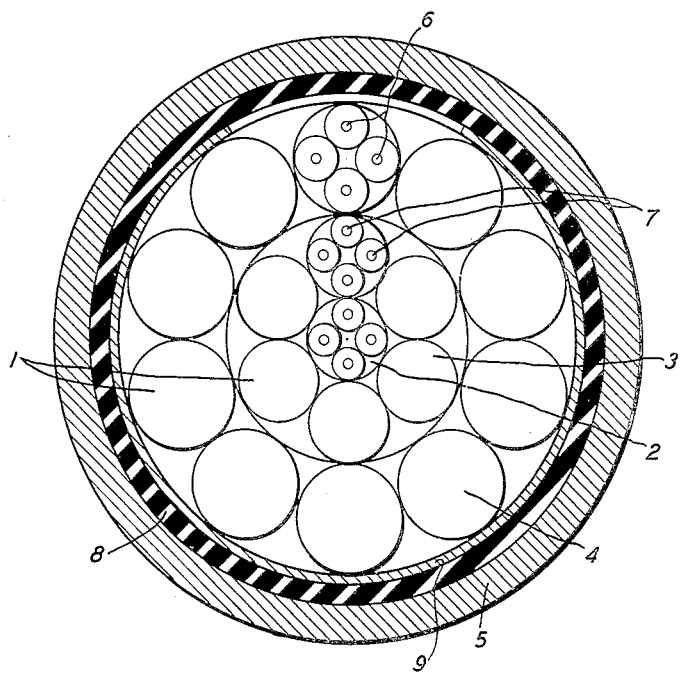
INVENTOR
E. BAGULEY
BY O. E. Rasmussen
ATTORNEY Patented Aug. 27, 1940

2,212,927

UNITED STATES PATENT OFFICE 2,212,927

LEAD COVERED MULTICONDUCTOR ELECTRIC TELEPHONE CABLE

Eric Baguley, London, England, assignor to Western Electric Company, Incorporated, New York, N. Y., a corporation of New York Application February 13, 1940, Serial No. 318,759
In Great Britain February 7, 1939

5 Claims. (Cl. 174—36)

This invention relates to improvements in lead covered multiconductor electric telephone cables for carrier current communication.

It is an object of the invention to make the transmission characteristics at carrier frequencies of the circuits formed by conductors in the outer layer cores approximately the same as the transmission characteristics of the circuits formed by conductors in the inner layer cores.

It has been found to be difficult with normal construction to design a carrier cable in which the transmission characteristics are the same within reasonable limits for all the circuits within a lead sheathed cable. With such normal construction it is impossible effectively to balance successive lengths of cable by cross-splicing or other means so as to reduce cross-talk and impedance irregularities. The difficulties are due to the effect at carrier frequencies of the lead sheath upon the circuits formed by conductors of the outer layer of cores which, due to the proximity of the sheath, have a higher alternating current resistance and a lower self inductance than the circuits formed by conductors of the inner layer cores. In the British Patent No. 453,124 accepted on September 1, 1936, it is proposed to reduce the unequal effect of the lead sheath by interposing between the sheath and the outer cores a layer of dielectric material of such a thickness that the transmission characteristics of the circuits formed by conductors of the outer layer are made approximately equal to the transmission characteristics of the circuits formed by conductors of the inner layer cores.

According to a feature of the present invention conductors of the outer layer cores are spaced further apart from one another than the conductors of the inner layer cores. In this manner the alternating current resistance and self inductance of the circuits formed by conductors in the outer layer may be made substantially the same as the alternating current resistance and self inductance of the circuits formed by conductors in the inner layers.

It may be found that this arrangement results in the circuits formed by conductors of the outer layer cores having reduced mutual capacities. In accordance with another feature of the invention this difficulty may be overcome by raising the mutual capacities of the circuits formed by conductors of the outer layer cores without appreciably altering the alternating current resistance or self inductance thereof; for example, the dielectric constant of the insulation of the outer layer cores may be made higher than that of the inner layer cores either by using a different insulating material having an intrinsically higher dielectric constant, or by packing the insulation rather more tightly, or by changing the ratio of air insulation to solid insulating material, e. g. paper. Alternatively, a thin conducting layer may be interposed between the laid-up cores and the sheath as described in the British patent referred to above.

In order that the invention may be clearly understood reference is directed to the accompanying drawing which shows diagrammatically and by way of example a cross-section of a cable embodying the invention.

Referring to the drawing, the reference 1 denotes the cores which in the cable illustrated are quads, but it will be understood that the term cores, as employed in this specification, is a general one including twisted pairs of conductors, twisted quads of either of the well-known kinds, i. e. star quads or D-M quads, or even twisted groups of six or eight conductors of which balanced transmission circuits are selected in ways known in the art. The cores 1 are arranged in consecutive layers 2, 3, and 4 within a lead or like sheath 5. The conductors 6 of the outer layer cores are of the same gauge as the conductors 7 of the inner layer cores, but according to the invention the conductors 6 are spaced apart within the cores by a greater distance than the conductors 7 and the spacing of the conductors 6 of the outer layer cores is so determined, e. g. by measurement by the alternating current resistance and self inductance of the various circuits, that the transmission characteristics of the circuits formed by conductors of the outer layer cores are made approximately equal to the transmission characteristics of the circuits formed by conductors of the inner layer cores. The cores 4 of the outer layer are spaced from the lead sheath by an insulating layer 8, the arrangement being such that the layer 8 and the spacing of the conductors 6 has the desired effect on the transmission characteristics of the circuits formed by the outer layer conductors. When desired a thin conducting layer 9 may be interposed between the outer layer cores and the insulating layer 8, as by the spiral application of a thin metal strip, with or without overlap in accordance with the requirements in each instance.

It will be understood therefore, that the object of the invention may be attained either by the different spacing of the conductors of the outer layer cores or by the different spacing of the conductors of the outer layer cores in combination with the insertion of an insulating layer between the outer layer and the sheath.

In explanation of the technical effect obtained it may be mentioned that the proximity of the sheath tends to raise the alternating current resistance and lower the self inductance of the circuits formed by conductors disposed near to the sheath; by increasing the spacing of the conductors of the outer layer cores the opposite effect may be obtained on the circuits so that a balance can be struck at which the transmission characteristics of the circuits formed by outer layer conductors and the circuits formed by inner layer conductors are approximately the same. If desired a cable construction according to the invention may be used in which the outer layer conductors are spaced apart from one another a certain distance and in which the sheath is spaced from the cores a certain distance, the cumulative effect being to equalize the transmission characteristics of the various circuits.

In practice the spacing apart of the conductors may be achieved by lapping the conductors of the outer layer cores with rather more insulating material, e. g. paper. If the conductors are insulated with helical lappings of paper tape, the increased spacing may be achieved by applying a wider and/or thicker paper tape or alternatively by applying the same size of paper tape with a greater number of convolutions per unit length.

What is claimed is:

1. A multiconductor telephone cable comprising an outer metallic sheathing enclosing a plurality of conductor cores arranged in definite layers at different depths within said sheathing, each of said cores including a plurality of insulated conductors forming at least one circuit, said conductors in a core closer to said sheathing being spaced apart further than those in a core placed at a greater depth to substantially equalize the characteristics of the said circuits in said cores, and said conductors being of the same diameter at the different spacings.

2. A multiconductor telephone cable comprising a plurality of conductor cores formed into an inner layer, a plurality of conductor cores formed into an outer layer, a metallic sheathing entirely surrounding said outer layer, each of said conductor cores including a definite plurality of insulated conductors to form a circuit, the conductors within each of said outer layer cores being mutually spaced a greater distance apart than those within each of said inner layer cores to at least partly offset the difference in effect of said sheathing upon circuit characteristics at carrier frequencies of said outer and inner layer core circuits, and said conductors being of the same diameter in said inner and outer layers.

3. A multiconductor telephone cable comprising an outer metallic sheathing enclosing a plurality of conductor cores each including the same number of insulated conductors of the same gauge, a first of said conductor cores being placed throughout its length closer to said sheathing than a second of said conductor cores, and the conductors in said first conductor core being mutually spaced apart a greater distance than those of the second conducting cores to reduce the difference in effect of said sheathing upon circuit characteristics of the first and second core circuits.

4. A multiconductor cable in accordance with claim 2 in which a separating layer of insulating material is placed between said outer layer of conducting cores and said sheathing to further offset the said difference in effect of said sheathing.

5. A multiconductor carrier-frequency telephone cable comprising a plurality of conductor cores formed into an inner layer, a plurality of conductor cores formed into an outer layer, a comparatively heavy conducting sheathing entirely surrounding said outer layer, each of said conductor cores including a definite plurality of insulated conductors to form a circuit, the conductors within each of said outer layer cores being mutually spaced apart a greater distance than those within said inner layer cores to at least partly offset the difference in effect of said sheathing upon certain circuit characteristics of said outer and inner layer core circuits, a separating layer of insulating material placed between said outer layer of cores and said sheathing to further offset said difference in effect of said sheathing, and a comparatively thin conducting layer at least partly surrounding said outer layer of cores within said separating layer to at least partly offset the effect of said separating layer upon certain other circuit characteristics of said outer layer core circuits, and the conductors in said inner and outer layer cores being of the same diameter.

ERIC BAGULEY.